No. 848,540. PATENTED MAR. 26, 1907.
J. M. EARLY.
FERTILIZER AND LIME DISTRIBUTER.
APPLICATION FILED JAN. 31, 1906.

4 SHEETS—SHEET 1.

Witnesses
C. K. Reichenbach.
J. C. Jones

Inventor
J. M. Early

By Chandler & Chandler
Attorneys.

No. 848,540. PATENTED MAR. 26, 1907.
J. M. EARLY.
FERTILIZER AND LIME DISTRIBUTER.
APPLICATION FILED JAN. 31, 1906.

4 SHEETS—SHEET 2.

Witnesses
C. K. Reichenbach
J. C. Jones

Inventor
J. M. Early
By Chandlee & Chandlee
Attorneys

No. 848,540. PATENTED MAR. 26, 1907.
J. M. EARLY.
FERTILIZER AND LIME DISTRIBUTER.
APPLICATION FILED JAN. 31, 1906.

4 SHEETS—SHEET 3.

Witnesses
C. K. Reichenbach.
F. C. Jones

Inventor
J. M. Early.
By Chandler & Chandler
Attorneys.

No. 848,540. PATENTED MAR. 26, 1907.
J. M. EARLY.
FERTILIZER AND LIME DISTRIBUTER.
APPLICATION FILED JAN. 31, 1906.

4 SHEETS—SHEET 4.

Witnesses
C. K. Reichenbach
F. C. Jones

Inventor
J. M. Early
By Chandlee & Chandlee
Attorneys

UNITED STATES PATENT OFFICE.

JAMES M. EARLY, OF INDIANA, PENNSYLVANIA.

FERTILIZER AND LIME DISTRIBUTER.

No. 848,540.　　　　Specification of Letters Patent.　　　　Patented March 26, 1907.

Application filed January 31, 1906. Serial No. 298,875.

*To all whom it may concern:*

Be it known that I, JAMES M. EARLY, a citizen of the United States, residing at Indiana, in the county of Indiana, State of Pennsylvania, have invented certain new and useful Improvements in Fertilizer and Lime Distributers; and I do hereby declare the following to be a full, clear, and exact description of the invention, such as will enable others skilled in the art to which it appertains to make and use the same.

This invention relates to fertilizer and lime distributers, and contemplates the provision of novel means for securing even feeding of the fertilizer or lime and means for regulating the said feed or of shutting the same off when the machine is at rest.

Other novel features of construction and arrangement of parts will be apparent from the following description, taken in connection with the accompanying drawings, in which—

Figure 1:
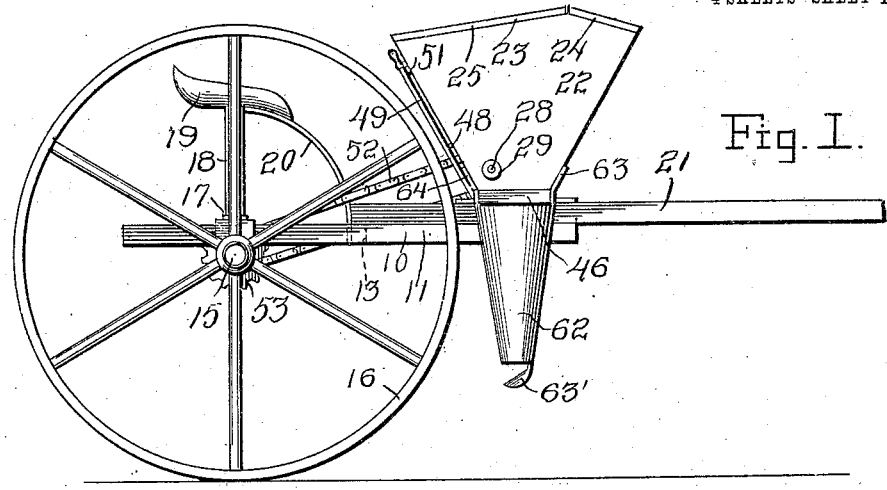
Figure 2:
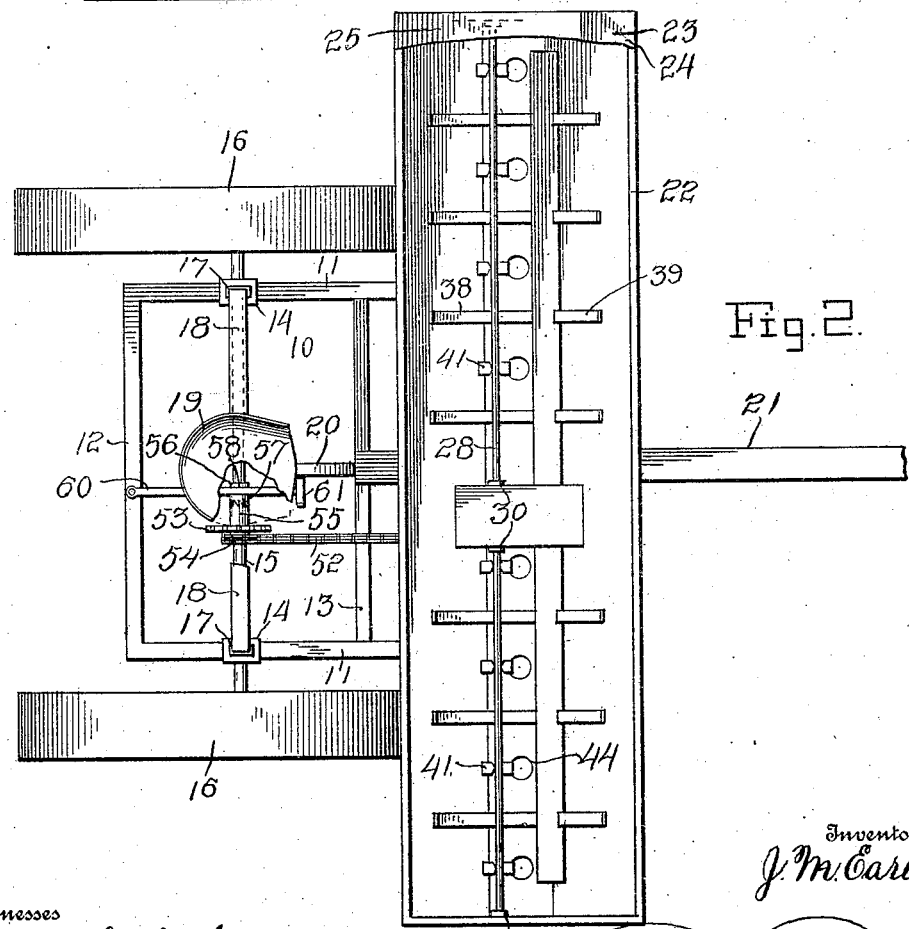
Figure 3:
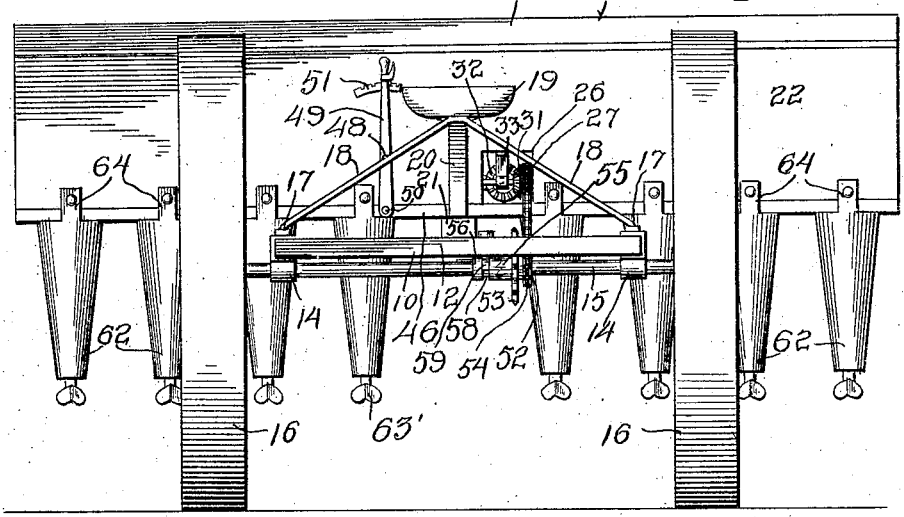
Figure 4:
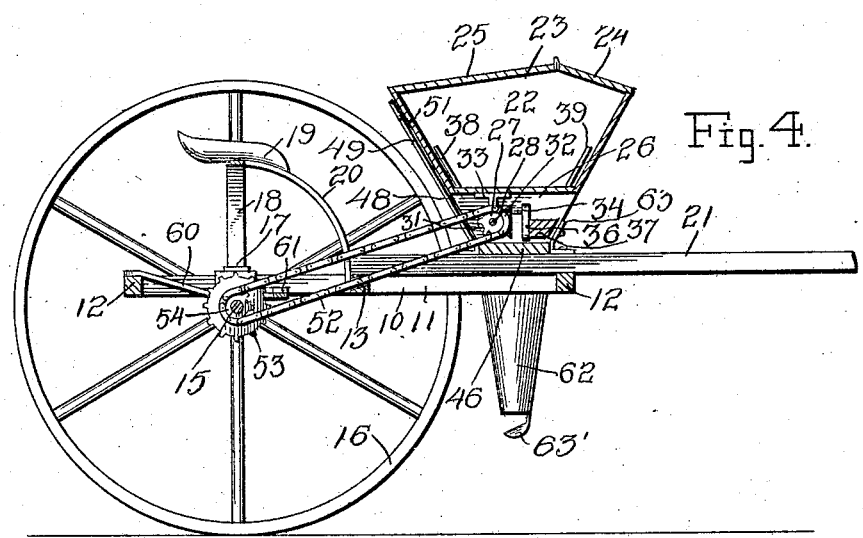
Figure 5:
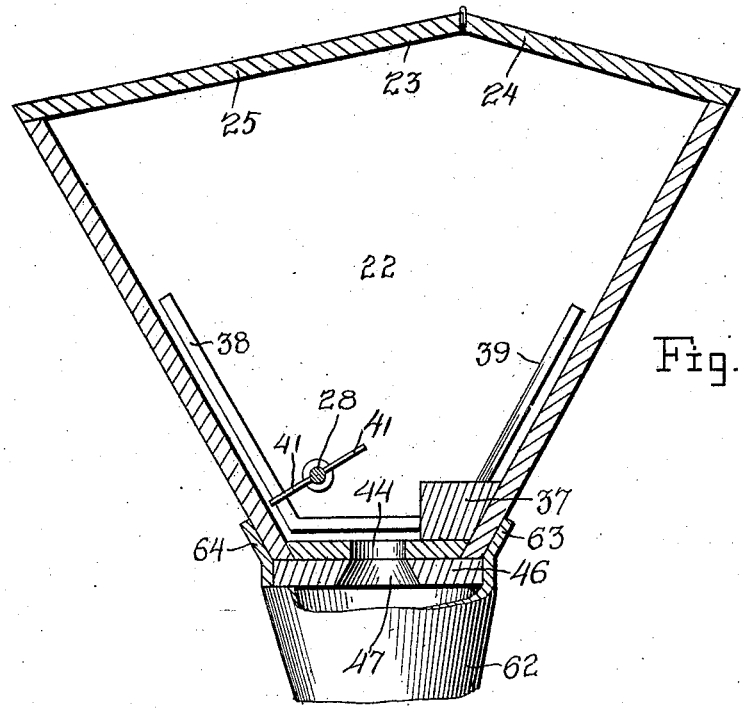
Figure 6:
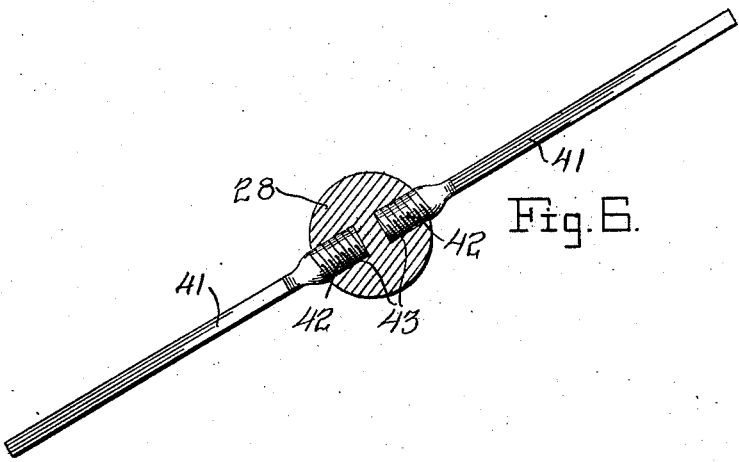
Figure 7:
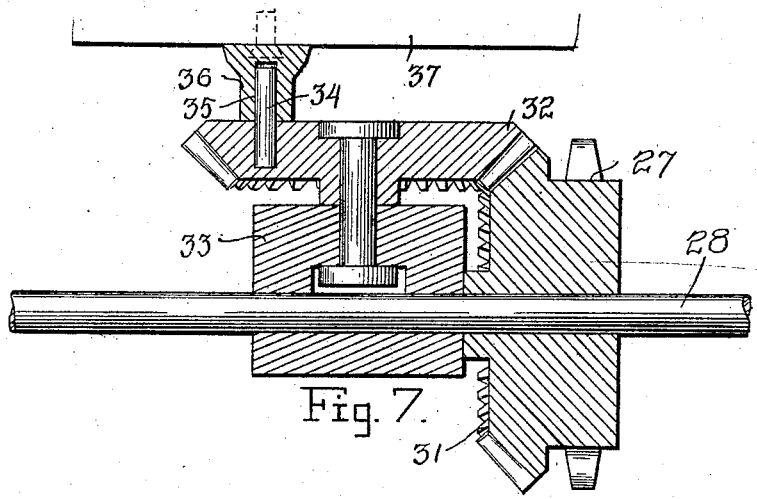
Figure 8:
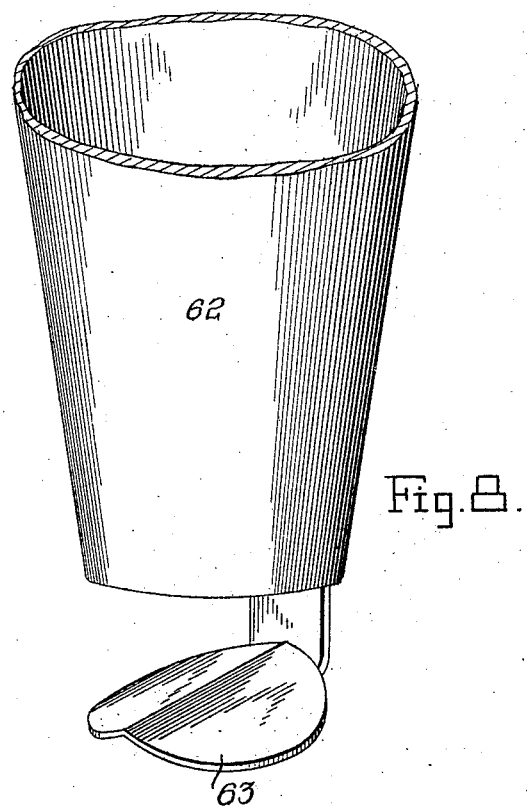

Figure 1 is a side elevation of the invention. Fig. 2 is a top plan view of the same with the cover of the hopper removed. Fig. 3 is a rear elevation. Fig. 4 is a vertical longitudinal sectional view through the same. Fig. 5 is a detail vertical transverse sectional view through the hopper. Fig. 6 is a detail sectional view through a portion of the beater-shaft, showing the manner of securing the beater-blades therein. Fig. 7 is a detail vertical sectional view through the gearing for actuating the vibrator, and Fig. 8 is a detail perspective view of one of the distributer-spouts.

Referring to the drawings, the numeral 10 indicates the frame of my fertilizer-distributer, which comprises spaced parallel side members 11, front and rear connecting members 12, and an intermediate connecting member 13.

Mounted in suitable bearings 14 on the side members 11 is an axle 15, to each end of which is keyed a wheel 16. The said bearings 14 are provided with sockets 17, in which are received the lower ends of seat-standards 18, which converge upwardly toward each other and are secured at their upper ends to a seat 19, and connected at one of its ends to the seat and at the other of its ends to the intermediate connecting member 13 is a third standard 20.

Secured at its rear end to the intermediate connecting member 13 is a tongue 21, and disposed upon the frame above the said tongue is a hopper 22, provided with a cover 23, comprising a minor fixed member 24 and a major hinged member 25, the latter lying at the rear portion of the hopper, so that heavy bags of fertilizer may be rested upon the wheels of the frame when the hopper is being filled.

The under side of the hopper is recessed, as at 26, to one side of the middle of the same to receive a sprocket-gear 27, which is mounted on a shaft 28, which in turn is mounted in bearings 29 in the ends of the hopper and 30 in the walls of the recessed portion. Formed integrally with the sprocket-gear 27 are teeth of a bevel-gear 31, which meshes with a bevel-gear 32, which is revolubly mounted on a bracket-bearing 33, which latter is mounted on the shaft 28 and is secured to the under side of the top wall of the recessed portion. A pin 34 is carried by the bevel-gear 32 and works in a slot 35 in a block 36, carried by a rod 37, provided with a series of vibrators comprising each an arm 38, which extends parallel and in spaced relation to one wall of the hopper, and an arm 39, which extends across a portion of the floor of the hopper and is thence curved upwardly and lies against the opposite wall thereof.

The shaft 28 is provided at intervals throughout its length with pairs of beater-blades 41, the blades of each pair being extended in diametrically opposite directions from each other and are each provided with a threaded stem 42, which is engaged in a threaded socket 43 in the shaft.

The beater-blades 41 are disposed above openings 44, formed in the floor of the hopper, and slidably disposed below the said floor is a plate 46, provided throughout its length with openings 47, which register with the openings 44 in the floor of the hopper, the said openings 47 being wider at the lower portion than at their upper portion. Pivoted, as at 48, to the rear wall of the hopper 22 is a lever 49, which is pivoted at its lower end, as at 50, to the rear edge of the plate 46, whereby the said plate may be shifted to regulate the size of the openings in the floor of the hopper, thereby regulating the feed of the fertilizer, a segmental rack 51 being provided upon the said wall of the hopper to hold the said lever in its adjusted position.

A sprocket-chain 52 is engaged with the sprocket-gear 27 on shaft 28 and is adapted for interchangeable engagement with large and small sprocket-gears 53 and 54, respectively, carried by a sleeve 55, mounted upon the axle 15. The said axle is provided with one member 56 of a clutch, and the said sleeve 55 is provided at one of its ends with the other member 57 of the clutch. The sleeve 56 is provided with an annular groove 58, in which is engaged a yoke 59 on one end of a lever 60, which is pivoted at the other of its ends to the rear connecting member 12 of the frame, the said lever 60 being provided with a foot-piece 61, whereby the same may be operated to throw it in and out of gear.

Distributer-chutes 62 are provided at their upper front and rear edges with ears 63 and 64, whereby the same may be secured to the front and rear walls of the hopper to suspend the said chutes beneath the openings in the floor of the hopper. The said chutes serve to support the sliding plate 46, as will be readily understood. At their lower front edges the chutes 62 are provided with lips 63, which are turned rearwardly and lie below the lower ends of the chutes proper and in spaced relation thereto, the lips 63 being bent downwardly at an angle at each side of their middle. From the foregoing it will be understood that when the machine is in motion the vibrator series will be reciprocated and the beater-shaft revolved, the former loosening and disintegrating the fertilizer and the latter serving to force the same through the openings in the floor of the hopper.

What is claimed is—

1. A distributer comprising a frame arranged for travel, the hopper mounted upon the frame, the rod arranged for reciprocatory movement in the hopper, the plurality of arms extending upwardly from the rod and lying against the forward wall of the hopper, the plurality of arms extending rearwardly from the rod to lie against the floor of the hopper and thence upwardly to lie against the rear wall thereof, and means for reciprocating the rod.

2. A distributer comprising a frame arranged for travel the hopper mounted upon the frame, the rod mounted for reciprocatory movement in the hopper, arms extending upwardly from the rod and in spaced parallel relation to the forward wall of the hopper, arms extending rearwardly from the rod and in spaced parallel relation to the floor of the hopper, said last-named arms being directed upwardly to lie in spaced parallel relation to the rear wall of the hopper, the beater-shaft journaled for rotation in the hopper adjacent the rear wall thereof, the beater-arms carried by the shaft and arranged to move between the upturned portions of the last-named vibrator-arms, and means for reciprocating the rod.

3. A distributer comprising a frame arranged for travel, a hopper mounted upon said frame, a series of vibrators mounted in said hopper and arranged for reciprocatory movement therein, each of said vibrators comprising an arm adapted to move along one of the walls of the hopper and an arm adapted to move along the other of the walls and the floor of the hopper and means for reciprocating said vibrator series.

4. A distributer comprising a frame arranged for travel, a hopper mounted upon said frame, a series of vibrators mounted in said hopper and arranged for reciprocatory movement therein, each of said vibrators comprising an arm adapted to move along one of the walls of the hopper and in spaced relation thereto and an arm adapted to move along the other of the walls and the floor of the hopper and means for reciprocating said vibrator series.

5. A distributer comprising a frame arranged for travel, the hopper mounted upon the frame, the vibrator mounted within the hopper for reciprocatory movement, the power-shaft, the beater-shaft journaled for rotation in the hopper, gear connections between said power-shaft and said beater-shaft, the gear connections between said beater-shaft and said vibrator.

In testimony whereof I affix my signature in presence of two witnesses.

JAMES M. EARLY.

Witnesses:
J. M. MARSHALL,
MINTA ORTZ.